(12) United States Patent
Andersson

(10) Patent No.: US 8,870,658 B2
(45) Date of Patent: Oct. 28, 2014

(54) GAMING SYSTEM AND A METHOD OF MANAGING BANDWIDTH USAGE IN A GAMING NETWORK

(75) Inventor: Sven Hakan Andersson, Sundbyberg (SE)

(73) Assignee: Aristocrat Technologies Australia Pty Ltd (AU)

( * ) Notice: Subject to any disclaimer, the term of this patent is extended or adjusted under 35 U.S.C. 154(b) by 1784 days.

(21) Appl. No.: 11/971,649

(22) Filed: Jan. 9, 2008

(65) Prior Publication Data

US 2008/0182666 A1 Jul. 31, 2008

(30) Foreign Application Priority Data

Jan. 29, 2007 (AU) ................................ 2007900413

(51) Int. Cl.
*A63F 13/12* (2006.01)

(52) U.S. Cl.
USPC .......................................................... 463/42

(58) Field of Classification Search
USPC .................... 463/42; 379/221.07; 709/226
See application file for complete search history.

(56) References Cited

U.S. PATENT DOCUMENTS

| | | | |
|---|---|---|---|
| 6,050,898 A * | 4/2000 | Vange et al. | 463/42 |
| 6,390,922 B1 * | 5/2002 | Vange et al. | 463/42 |
| 6,876,668 B1 | 4/2005 | Chawla et al. | |
| 7,627,632 B2 * | 12/2009 | Douceur et al. | 709/205 |
| 7,680,038 B1 * | 3/2010 | Gourlay | 370/230 |
| 7,711,005 B1 * | 5/2010 | Sindhu et al. | 370/468 |
| 2001/0039582 A1 * | 11/2001 | McKinnon et al. | 709/226 |
| 2006/0287098 A1 * | 12/2006 | Morrow et al. | 463/42 |
| 2007/0243925 A1 * | 10/2007 | LeMay et al. | 463/20 |
| 2008/0293494 A1 * | 11/2008 | Adiraju et al. | 463/42 |

* cited by examiner

*Primary Examiner* — Jay Trent Liddle
(74) *Attorney, Agent, or Firm* — McAndrews, Held & Malloy, Ltd.

(57) ABSTRACT

A gaming system is disclosed which comprises a plurality of gaming machines, and a communications network arranged to facilitate communications between respective gaming machines, the communications network having an associated bandwidth for communications to and from the communications network. Each gaming machine is arranged to send status data indicative of whether the gaming machine is performing an activity requiring bandwidth usage to the other gaming machines, and each gaming machine is arranged to determine the amount of bandwidth available to the gaming machine for non-game implementation related activity using the status data received from the other gaming machines. A corresponding method is also disclosed.

28 Claims, 4 Drawing Sheets

GAMING SYSTEM AND A METHOD OF MANAGING BANDWIDTH USAGE IN A GAMING NETWORK

CROSS REFERENCE TO RELATED APPLICATIONS

This application claims priority to Australian Patent Application No. AU2007900413, having an international filing date of Jan. 29, 2007, entitled "A Gaming System and a Method of Managing Bandwidth Usage in a Gaming Network", which is hereby incorporated by reference herein in its entirety.

FIELD OF THE INVENTION

The present invention relates to a gaming system and to a method of managing bandwidth usage in a gaming network.

BACKGROUND OF THE INVENTION

It is known to provide a gaming system which comprises a plurality of player operable gaming machines connected together in a network and a remote gaming base station which communicates with the gaming machines for example through the Internet. The remote gaming base station may cooperate with each of the gaming machines so that a game is partly implemented by the gaming machine and partly implemented by the remote gaming base station, or so that a game is predominantly implemented by the remote gaming base station and the gaming machine acts only as a terminal providing a player interface. This type of server-based gaming arrangement provides a flexible platform which simplifies gaming management by centralizing gaming management functions at the gaming base station. In particular, the arrangement allows games which are implementable using the gaming base station and the gaming machines to be updated centrally at the gaming base station, and expensive gaming machines dedicated to one or more particular games are avoided.

However, with such client-server type gaming arrangements, a problem can occur because several networked gaming machines typically share a common communications link with the remote base station which can cause gaming machines to compete with each other for bandwidth. This is of particular concern when a gaming machine performing a file download for the purpose of updating gaming machine software prevents another gaming machine from implementing a game.

SUMMARY OF THE INVENTION

In accordance with a first aspect of the present invention, there is provided a gaming system comprising:
  a plurality of gaming machines; and
  a communications network arranged to facilitate communications between respective gaming machines, the communications network having an associated bandwidth for communications to and from the communications network;
  wherein each gaming machine is arranged to send status data indicative of whether the gaming machine is performing an activity requiring bandwidth usage to the other gaming machines, and each gaming machine is arranged to determine the amount of bandwidth available to the gaming machine for non-game implementation related activity using the status data received from the other gaming machines.

In one embodiment, the gaming system comprises a remote base station arranged to communicate with one or more gaming machines so as to implement a game.

The remote gaming base station may comprise a gaming server.

The gaming system may be arranged to operate such that during implementation of a game part of the game is executed on a gaming machine and part of the game is executed by the gaming server, or a such that most of the game is executed remotely by the gaming server and the gaming machine is used only to display audible and/or visible gaming information to the player and receive gaming inputs from the player.

In one embodiment, each gaming machine is capable of receiving gaming machine update data from the remote base station.

The status data sent by a gaming machine may include information indicative of whether the gaming machine is inactive.

The status data sent by a gaming machine may include information indicative of whether the gaming machine is implementing a game and/or is downloading update data.

The update data may be software update data and/or advertising data. For this purpose, the remote base station may include a software update server and/or an advertising update server.

Each gaming machine may be arranged to prioritise bandwidth usage so that adequate bandwidth is available for all games being implemented by the gaming system by modifying the bandwidth available for receiving gaming machine update data.

The gaming machines may be disposed at the same location or may be at least partly remotely disposed relative to each other.

According to a second aspect of the present invention there is provided an electronic gaming machine comprising:
  a data communication component arranged to:
    send status data indicative of whether the gaming machine is performing an activity requiring bandwidth usage to the other gaming machines; and
    receive status data from at least one other electronic gaming machine via a communications network, the communications network having an associated bandwidth for communications to and from the communications network, and the status data being such that it conveys information about an activity requiring bandwidth usage being performed by the or each other electronic gaming machine;
  wherein the gaming machine is arranged to use the status data to determine the amount of bandwidth available to the gaming machine for non-game implementation related activity.

In accordance with a third aspect of the present invention, there is provided a method of managing bandwidth usage in a gaming network comprising a plurality of gaming machines and a communication network arranged to facilitate communications between respective gaming machines, the communication network having an associated bandwidth, the method comprising:
  for each gaming machine, sending status data indicative of whether the gaming machine is performing an activity requiring bandwidth usage to the other gaming machines; and
  for each gaming machine, determining the amount of bandwidth available to the gaming machine for non-game implementation related activity using the status data received from the other gaming machines.

In accordance with a fourth aspect of the present invention, there is provided a computer program arranged when loaded into a computer enabled gaming machine to instruct the gaming machine to operate in accordance with a gaming machine comprising:

a data communication component arranged to:

send status data indicative of whether the gaming machine is performing an activity requiring bandwidth usage to the other gaming machines; and receive status data from at least one other electronic gaming machine via a communications network, the communications network having an associated bandwidth for communications to and from the communications network, and the status data being such that it conveys information about an activity requiring bandwidth usage being performed by the or each other electronic gaming machine;

wherein the gaming machine is arranged to use the status data to determine the amount of bandwidth available to the gaming machine for non-game implementation related activity.

In accordance with a fifth aspect of the present invention, there is provided a computer readable medium having computer readable program code embodied therein, the computer readable program code being arranged when loaded into a computer enabled gaming machine to cause the gaming machine to operate in accordance with a gaming machine comprising:

a data communication component arranged to:

send status data indicative of whether the gaming machine is performing an activity requiring bandwidth usage to the other gaming machines; and receive status data from at least one other electronic gaming machine via a communications network, the communications network having an associated bandwidth for communications to and from the communications network, and the status data being such that it conveys information about an activity requiring bandwidth usage being performed by the or each other electronic gaming machine;

wherein the gaming machine is arranged to use the status data to determine the amount of bandwidth available to the gaming machine for non-game implementation related activity.

BRIEF DESCRIPTION OF THE DRAWINGS

Certain embodiments of the present invention will now be described, by way of example only, with reference to the accompanying drawings, in which.

DESCRIPTION OF CERTAIN EMBODIMENTS OF THE INVENTION

Figure 1:
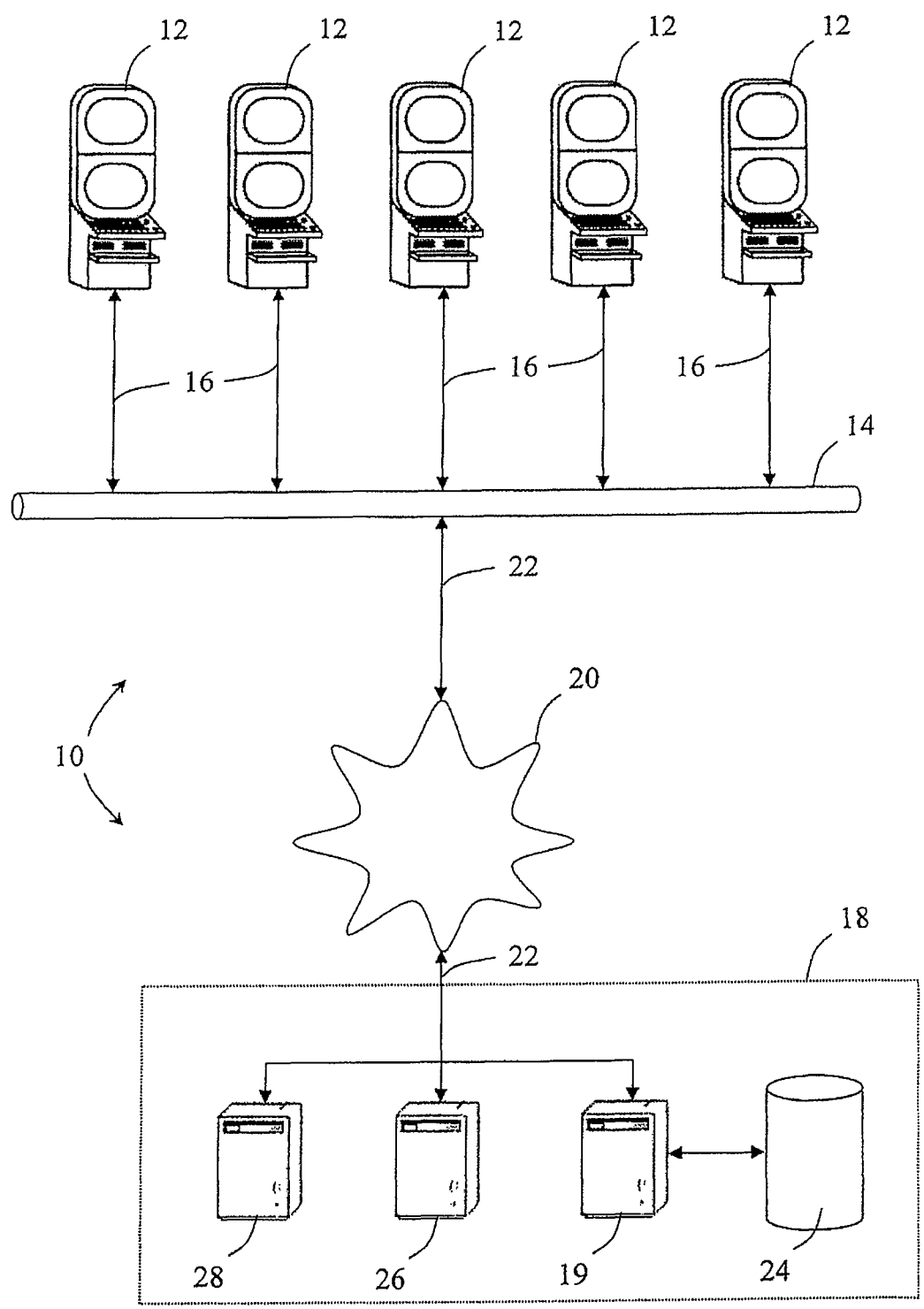
FIG. 1 is a schematic diagram of a gaming system in accordance with an embodiment of the present invention.
Figure 2:
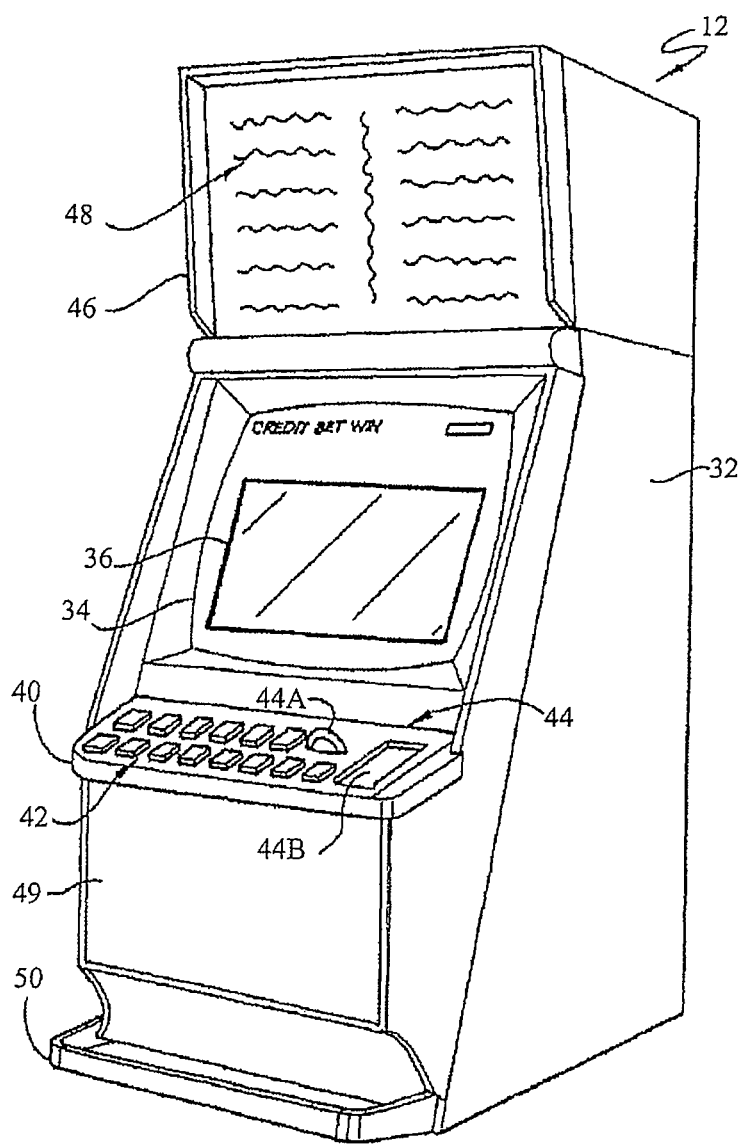
FIG. 2 is a diagrammatic representation of a gaming machine of the gaming system shown in FIG. 1.
Figure 3:
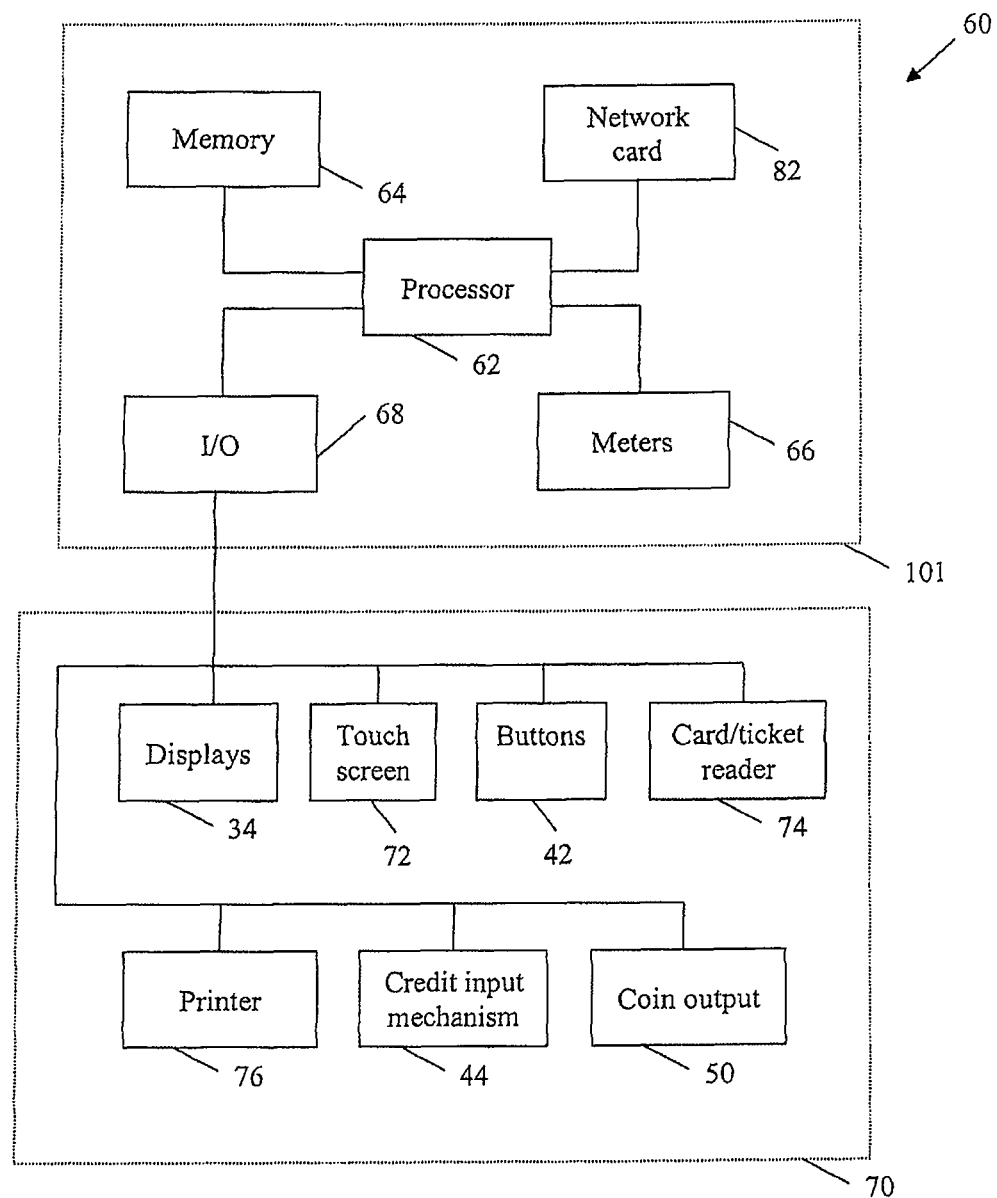
FIG. 3 is a schematic block diagram of operative components of the gaming machine shown in FIG. 2.

Referring to FIGS. 1 to 3 of the drawings, there is shown a gaming system 10 including multiple player operable gaming machines 12, each of which in this example is arranged to implement a probabilistic wagering game of the type wherein a player wagers a bet amount, and a game outcome is determined in a probabilistic way. With some such probabilistic games, several symbols from a set of symbols are randomly displayed, and a game outcome is determined on the basis of the displayed symbols.

The gaming machines 12 are connected together through a local network 14 which facilitates communications between the gaming machines via respective local communications links 16. The local network 14 also facilitates communications with a remote base station 18, in this example through the Internet 20. During use, when a communication is established between the local network 14 and the remote base station 18, all communications between the gaming system 10 and the remote base station 18 flow through an external communications link 22.

The remote base station 18 includes a gaming server 19, and a database 24 for storing programs and data which may be served to the gaming machines 12 by the gaming server 19 during use so that the gaming machines 12 may implement a game.

The remote base station 18 also includes a software update server 26 and an advertising server 28. The software update server 26 is used to provide the gaming machines 12 with update software. The advertising server 28 is used to provide each of the gaming machines 12 with up to date advertising material which may be displayed to players during and/or between games.

The gaming system 10 and the remote base station 18 together form a distributed gaming network.

It will be understood that since the bandwidth available on the external communications link 22 is finite and all communications between the gaming machines 12 and the remote base station 18 pass through the external communications link 22, the communication speeds associated with the gaming machines 12 are interdependent in that an increase in communication speed of one gaming machine has the potential to affect the communication speed available for one or more other gaming machines 12. Such communication interdependent gaming machines 12 are commonly referred to as a Communication Dependency Cluster (CDC).

It will also be understood that since the gaming system 10 shown in FIG. 1 has a distributed network architecture, some of the components required for implementing the game are present in each of the player operable gaming machines 12 and some of the components required for implementing the game are remotely located and executed in this example by the gaming server 19 in association with the database 24. Various arrangements for implementing a game using this type of architecture are envisaged.

For example, a "thick client" arrangement may be used wherein part of the game is executed on a gaming machine 12 and part of the game is executed by the gaming server 19, or a "thin client" arrangement may be used wherein most of the game is executed remotely by the gaming server 19 and a gaming machine 12 is used only to display audible and/or visible gaming information to the player and receive gaming inputs from the player.

However, it will be understood that other arrangements are envisaged. For example, an architecture may be provided wherein the respective functions of the gaming machine 12 and the gaming server 19 are selectively modifiable. For example, the gaming system may operate in stand alone gaming machine mode, "thick client" mode or "thin client" mode depending on the game being played, operating conditions, and so on. Other variations will be apparent to persons skilled in the art.

A gaming machine 12 is illustrated in more detail in FIG. 2. The gaming machine 12 includes a console 32 having a display 34 on which is displayed representations of a game 36 that can be played by a player. A mid-trim 40 of the gaming machine 12 houses a bank of buttons 42 for enabling a player to interact with the gaming machine during gameplay, including enabling the player to select the bet amount. The mid-trim 40 also houses a credit input mechanism 44 which in this example includes a coin input chute 44A and a bill collector 44B. A reading device may also be provided for the purpose of reading a player tracking device, for example as part of a loyalty program. The player tracking device may be in the form of a card, flash drive or any other portable storage medium capable of being read by the reading device.

A top box 46 may carry artwork 48, including for example pay tables and details of bonus awards and other information or images relating to the game. Further artwork and/or information may be provided on a front panel 49 of the console 32. A coin tray 50 is mounted beneath the front panel 49 for dispensing cash payouts from the gaming machine 12.

The display 34 is in the form of a video display unit, particularly a cathode ray tube screen device. Alternatively, the display 34 may be a liquid crystal display, plasma screen, any other suitable video display unit. The top box 46 and/or the front panel 49 may also include a display, for example a video display unit, which may be of the same type as the display 34, or of a different type.

The top box 48, front panel 49 and/or the display 34 may further display advertising material which in this example is displayed in response to advertising data downloaded from the advertising server 28.

FIG. 3 shows a block diagram of operative components 60 of the gaming machine 12.

The operative components 60 include a processor 62 and a memory 64. Instructions and data to control operation of the processor 62 are stored in the memory 64. Typically, the gaming machine 12 will include both volatile and non-volatile memory and more than one of each type of memory, with such memories being collectively represented by the memory 64.

The gaming machine 12 also includes meters 66 for purposes including ensuring regulatory compliance and monitoring player credit, and an input/output (I/O) interface 68 for communicating with a player interface 70.

In the example shown in FIG. 3, the player interface 70 includes the display 34, buttons 42 and the credit input mechanism 44, and also comprises a touch screen 72, a card and/or ticket reader 74 and a printer 76. Additional hardware may be included as part of the gaming machine 12, or hardware may be omitted as required for the specific implementation.

In addition, the gaming machine 12 includes a communications interface, for example a network card 82, which facilitates communications between gaming machines 12 and with the remote base station 18 through the network 14.

In this embodiment, the game server 19 implements most or all of the game played by a player using a gaming machine 12, and the gaming machine 12 essentially provides only the player interface. During use, the gaming machine 12 receives player instructions, and passes the instructions to the gaming server 19 which processes the instructions and returns game play outcomes to the gaming machine 12 for display.

It will be understood that additional servers (not shown) may be provided to assist in the administration of the distributed network 26, including for example a gaming floor management server and a licensing server to monitor the use of licenses relating to particular games. An administrator terminal may also be provided to allow an administrator to monitor the distributed network and the gaming machines 12 connected to the network.

Each gaming machine 12, in this example the processor 62 and associated software stored in the memory 64, is arranged to determine the amount of bandwidth available to the gaming machine 12 for non-game implementation related activity based on the communication status of the gaming machine 12 and the communication status of the other gaming machines 12. In particular, each gaming machine 12 is arranged to send status data in the form of a status message to the other gaming machines 12 in the local network 14 to indicate whether the gaming machine is implementing a game, is inactive or is downloading update data such as file and/or software update data or advertising data from the remote base station 18. Each gaming machine 12 then compiles a record indicative of the status of all gaming machines in the local network 14 and stores the record in the memory 64 of the gaming machine 12. Each gaming machine 12 then determines the amount of bandwidth which is available to the gaming machine for non-game implementation related activity based on the status of the other gaming machines 12 with the aim of ensuring that sufficient bandwidth is available to those gaming machines 12 which are implementing a game.

Figure 4:
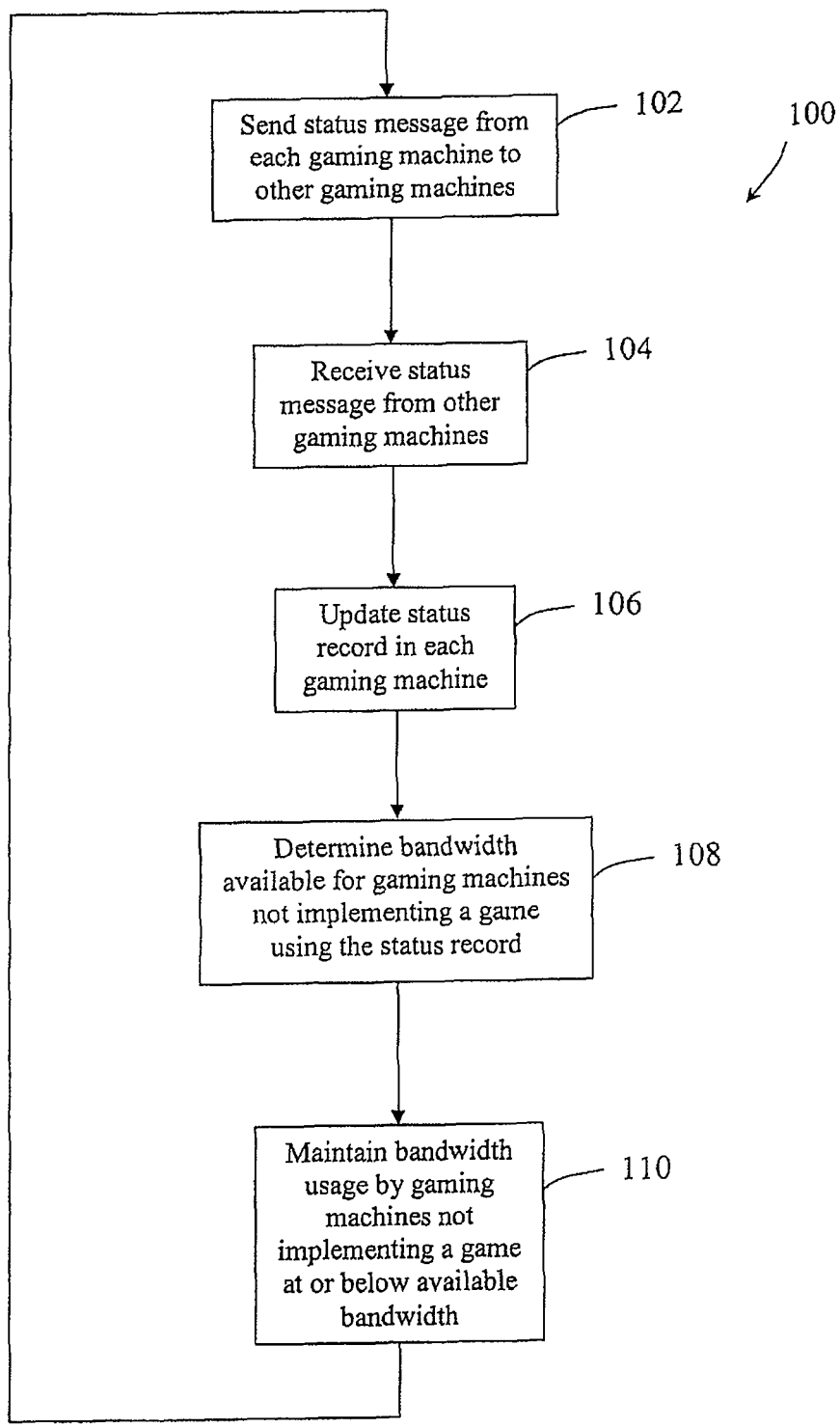
FIG. 4 is a flow diagram illustrating a method of managing bandwidth usage in a gaming system in accordance with an embodiment of the present invention.

Operation of an exemplary gaming system will now be described with reference to the flow diagram 100 shown in FIG. 4. The flow diagram illustrates steps 102 to 110 carried out by the gaming machines in a method of managing bandwidth usage in accordance with an embodiment of the invention.

In the present example, five gaming machines 12 are present in the local network 14, with one gaming machine 12 being inactive, three gaming machines 12 downloading update data and one gaming machine 12 implementing a game.

Each gaming machine 12 sends a status message to the other gaming machines 12 and a record is stored in each of the gaming machines to indicate the current status of all of the gaming machines in the local network 14.

If the status of one of the gaming machines changes from inactive to implementing a game, by virtue of the status messages each gaming machine 12 will be notified of the change of status and a determination is made by the respective gaming machines 12 as to the bandwidth available to the gaming machine, in particular whether a modification of the bandwidth available to the gaming machines 12 not implementing a game is required in order to maintain adequate bandwidth for implementing all games across the local network 14. If insufficient bandwidth is available for implementing one or more games, the bandwidth available to the gaming machines not implementing a game is reduced so that a sufficiently high bandwidth may be maintained for the gaming machines implementing a game.

Similarly, if the status of one of the gaming machines 12 changes from implementing a game to inactive, a determination is made by the gaming machines 12 as to the new bandwidth available to the gaming machines not implementing a game in order to maintain optimum bandwidth usage of the external communications link 22.

While the above example is described in relation to a gaming system having gaming machines which are disposed at the same location, it will be understood that other arrangements are possible. For example one or more of the gaming machines may be located remotely relative to the other gaming machines. With this arrangement, the remote gaming machine may connect to the network using a supplementary external communications link and receive updates and gaming instructions via the external communications link 22 as with the local gaming machines.

Modifications and variations as would be apparent to a skilled addressee are deemed to be within the scope of the present invention.

The invention claimed is:

1. A gaming system comprising:
   a plurality of gaming machines; and
   a communications network arranged to facilitate communications between respective gaming machines, the communications network having an associated total network bandwidth;
   wherein each gaming machine is configured to:
      send status data to other gaming machines over the communications network, wherein the status data is indicative of whether the gaming machine is performing an activity requiring bandwidth usage;
      receive status data from the other gaming machines over the communications network, wherein the status data received from each of the other gaming machines is indicative of whether the other gaming machine is performing an activity requiring bandwidth usage; and
   wherein each gaming machine is further configured to determine an amount of the total network bandwidth available to the gaming machine for non-game related activity using the status data received from the other gaming machines.

2. A gaming system as claimed in claim 1, further comprising a remote base station arranged to communicate with one or more gaming machines through the communications network so as to implement a game.

3. A gaming system as claimed in claim 2, wherein the remote base station comprises a gaming server.

4. A gaming system as claimed in claim 3, wherein the gaming system is arranged to operate such that during implementation of a game, part of the game is executed on a gaming machine and part of the game is executed by the gaming server.

5. A gaming system as claimed in claim 3, wherein the gaming system is arranged to operate such that most of the game is executed remotely by the gaming server and the gaming machine is used only to display audible and/or visible gaming information to a player and to receive gaming inputs from the player.

6. A gaming system as claimed in claim 2, wherein each gaming machine is capable of receiving gaming machine update data from the remote base station.

7. A gaming system as claimed in claim 6, wherein the status data includes information indicative of whether the gaming machine is downloading update data.

8. A gaming system as claimed in claim 6, wherein each gaming machine is configured to prioritize its own bandwidth usage so that adequate bandwidth is available for all games then currently active in the gaming system, wherein each gaming machine prioritizes its own bandwidth using the status data from other gaming machines by modifying the bandwidth available for receiving gaming machine update data.

9. A gaming system as claimed in claim 6, wherein the update data comprises software update data.

10. A gaming system as claimed in claim 9, further comprising a software update server.

11. A gaming system as claimed in claim 6, wherein the update data comprises advertising data.

12. A gaming system as claimed in claim 9, further comprising an advertising update server.

13. A gaming system as claimed in claim 1, wherein the status data includes information indicative of whether the gaming machine is inactive.

14. A gaming system as claimed in claim 1, wherein the status data sent by a gaming machine includes information indicative of whether the gaming machine is implementing a game.

15. An electronic gaming machine comprising:
   a data communication component arranged to:
      send status data over a communications network to other gaming machines, wherein the communications network has a total network bandwidth, wherein the status data is indicative of whether the electronic gaming machine is performing an activity requiring bandwidth usage;
      receive status data from at least one other electronic gaming machine via the communications network, wherein the status data from the at least one other electronic gaming machine conveys information about an activity requiring bandwidth usage that is currently performed by the at least one other electronic gaming machine; and
   wherein the gaming machine is configured to use the received status data to determine an amount of the total bandwidth available to the gaming machine for non-game related activity of the gaming machine.

16. A gaming machine as claimed in claim 15, wherein the gaming machine is arranged to receive gaming machine update data.

17. A gaming machine as claimed in claim 16, wherein the status data sent by the gaming machine includes information indicative of whether the gaming machine is downloading update data.

18. A gaming machine as claimed in claim 16 wherein the gaming machine is part of a gaming system having a plurality of gaming machines, and the gaming machine is arranged to self-prioritize bandwidth usage so that adequate bandwidth of the total bandwidth is available for games being implemented by other gaming machines of the gaming system.

19. A method of managing bandwidth usage in a gaming system comprising a plurality of gaming machines and a communication network arranged to facilitate communications between respective gaming machines, the communication network having an associated total network bandwidth, the method comprising:
   each gaming machine sending status data to other gaming machines that is indicative of whether the gaming machine is performing an activity requiring bandwidth usage of the total network bandwidth;
   each gaming machine receiving the status data from the other gaming machines; and
   each gaming machine determining an amount of bandwidth of the total network bandwidth that is available to the gaming machine for non-game related activity using the status data received from the other gaming machines.

20. A method as claimed in claim 19, comprising providing a remote base station arranged to communicate with one or more gaming machines through the communications network so as to implement a game.

21. A method as claimed in claim 20, comprising implementing part of a game on a gaming machine and part of the game on the gaming server.

22. A method as claimed in claim 20, comprising implementing most of the game remotely on the gaming server, and using the gaming machine only to display audible and/or visible gaming information to a player and to receive gaming inputs from the player.

23. A method as claimed in claim 20, comprising receiving gaming machine update data from the remote base station.

24. A method as claimed in claim 23, wherein the status data sent by a gaming machine includes information indicative of whether the gaming machine is downloading update data.

25. A method as claimed in claim 23 comprising self-prioritizing bandwidth usage of the total network bandwidth so that adequate bandwidth is available for all gaming machines that are running respective games by modifying the bandwidth available for receiving gaming machine update data.

26. A method as claimed in claim 19, wherein the status data sent by the gaming machine includes information indicative of whether the gaming machine is inactive.

27. A method as claimed in claim 19, wherein the status data sent by the gaming machine includes information indicative of whether the gaming machine is implementing a game.

28. A non-transitory computer readable medium having executable code for implementing a method to control a gaming machine connected by a communications network to other gaming machines, wherein the communications network has an associated total network bandwidth, the method comprising:

sending status data to the other gaming machines over the communications network, wherein the status data is indicative of whether the gaming machine is performing an activity requiring bandwidth usage of the total network bandwidth;

receiving status data from the other gaming machines over the communications network, wherein the status data received from each of the other gaming machines is indicative of whether the other gaming machine is performing an activity requiring bandwidth usage of the total network bandwidth; and wherein each gaming machine is further configured to determine an amount of the total network bandwidth available to the gaming machine for non-game related activity using the status data received from the other gaming machines.

* * * * *